United States Patent
Padhi et al.

(10) Patent No.: US 11,194,070 B2
(45) Date of Patent: Dec. 7, 2021

(54) WAVELET TRANSFORM-BASED COHERENT NOISE REDUCTION IN DISTRIBUTED ACOUSTIC SENSING

(71) Applicant: Halliburton Energy Services, Inc., Houston, TX (US)

(72) Inventors: Amit Padhi, Houston, TX (US); Mark Elliott Willis, Katy, TX (US)

(73) Assignee: Halliburton Energy Services, Inc., Houston, TX (US)

(*) Notice: Subject to any disclaimer, the term of this patent is extended or adjusted under 35 U.S.C. 154(b) by 304 days.

(21) Appl. No.: 16/550,043

(22) Filed: Aug. 23, 2019

(65) Prior Publication Data

US 2020/0103544 A1  Apr. 2, 2020

Related U.S. Application Data

(60) Provisional application No. 62/738,807, filed on Sep. 28, 2018.

(51) Int. Cl.
| | | |
|---|---|---|
| G01V 1/36 | (2006.01) | |
| G01V 1/42 | (2006.01) | |
| G01H 9/00 | (2006.01) | |

(52) U.S. Cl.
CPC ............. *G01V 1/368* (2013.01); *G01V 1/42* (2013.01); *G01H 9/004* (2013.01)

(58) Field of Classification Search
CPC ........... G01V 1/368; G01V 1/42; G01H 9/004
See application file for complete search history.

(56) References Cited

U.S. PATENT DOCUMENTS

| | | |
|---|---|---|
| 6,668,228 B1 | 12/2003 | Özbek et al. |
| 2005/0125156 A1 | 6/2005 | Soliman et al. |
| 2010/0145667 A1 | 6/2010 | Niu et al. |
| 2014/0102694 A1 | 4/2014 | Hargreaves et al. |

(Continued)

FOREIGN PATENT DOCUMENTS

| | | | |
|---|---|---|---|
| WO | 2020068403 A1 | 4/2020 | |
| WO | WO-2020068326 A1 * | 4/2020 | ............ G01V 1/42 |

OTHER PUBLICATIONS

Deighan, "Ground-Roll Suppression Using the Wavelet Transmform", Geophysics, vol. 62, No. 6, pp. 1896-1903, 1997.

(Continued)

*Primary Examiner* — Daniel Pihulic
(74) *Attorney, Agent, or Firm* — Gilliam IP PLLC (57) ABSTRACT

A distributed acoustic sensing (DAS) system is coupled to an optical fiber along a plurality of channels. The system generates a DAS seismic profile of the subsurface formation based on detected seismic data, identifies at least one region having coherent noise, and identifies which of the plurality of channels are within the identified at least one region. For each trace of data associated with the plurality of noisy channels, the system converts, from a time to a wavelet domain, the trace of data and a reference trace having less coherent noise, and suppresses the wavelet coefficients of the trace of data based on the wavelet coefficients of the reference trace. After the system mitigates the noise in the wavelet domain, an inverse wavelet transform is applied to the trace of data to convert back to the time domain and create a reduced noise DAS seismic profile.

20 Claims, 9 Drawing Sheets

(56) References Cited

U.S. PATENT DOCUMENTS

2020/0103544 A1* 4/2020 Padhi ...................... G01V 1/42

OTHER PUBLICATIONS

Mallat, "A Theory for Multiresolution Signal Decomposition: The Wavelet Representation", IEEE Transactions on Pattern Analysis Machine Intelligence, vol. 11, No. 7, pp. 674-693, 1989.
PCT Application Serial No. PCT/US2019/048028, International Search Report, dated Dec. 12, 2019, 3 pages.
PCT Application Serial No. PCT/US2019/048028, International Written Opinion, dated Dec. 12, 2019, 6 pages.
Song, et al., "Wavelet based noise suppression technique and its application to ultrasonic flaw detection", Ultrasonics, vol. 44, Issue 2, 2005, 6 pages.

* cited by examiner

WAVELET TRANSFORM-BASED COHERENT NOISE REDUCTION IN DISTRIBUTED ACOUSTIC SENSING

BACKGROUND

This disclosure generally relates to monitoring of hydrocarbon wellbores, and more particularly to noise removal for Distributed Acoustic Sensing (DAS) data.

Hydrocarbons, such as oil and gas, are commonly obtained from subterranean formations that may be located onshore or offshore. The development of subterranean operations and the processes involved in removing hydrocarbons from a subterranean formation are complex. Typically, subterranean operations involve a number of different steps such as, for example, drilling a wellbore through and/or into the subterranean formation at a desired well site, treating the wellbore to optimize production of hydrocarbons, and performing the necessary steps to produce and process the hydrocarbons from the subterranean formation. Some or all of these steps may require and utilize measurements and other sensed data to determine characteristics of the formation, the hydrocarbon, the equipment used in the operations, etc.

A fiber optic cable can be installed in the subterranean operations to detect seismic data in the form of a vertical seismic profile (VSP). VSP may refer to the measurement of seismic/acoustic energy in a wellbore originating from a seismic source at the surface of the wellbore (e.g., a vibrator truck, air gun, and/or explosives). In certain instances, DAS may be used to acquire the seismic data necessary to form the VSP. Acoustic sensing based on DAS may use the Rayleigh backscatter property of a fiber's optical core and may spatially detect disturbances that are distributed along a length of fiber positioned within a wellbore. DAS data may, however, suffer from noise artifacts that can reduce the accuracy of the seismic data and any calculations performed using the seismic data.

BRIEF DESCRIPTION OF THE DRAWINGS

Aspects of the disclosure may be better understood by referencing the accompanying drawings.

DESCRIPTION

Terminology

A "trace" refers to the seismic data recorded for a single channel.

A "pilot trace" refers to a trace to be cross-correlated with other traces when processing seismic data, for example a source sweep signal from a Vibroseis truck.

A "gather" refers to a collection of seismic traces sharing some common attribute, for example having a same midpoint or being collected from a single receiver.

A "shot gather" refers to a type of gather wherein the seismic traces are collected from a single shot.

The description that follows includes example systems, methods, techniques, and program flows that embody aspects of the disclosure. However, it is understood that this disclosure may be practiced without these specific details. For instance, this disclosure refers to DAS in illustrative examples. Aspects of this disclosure can also be applied to any other type of sensing. In another instance, this disclosure refers to continuous wavelet transform (CWT) used to reduce noise caused by cable slapping for DAS. Aspects of this disclosure can also be applied to other types of noise reducing transforms for these operations. In other instances, well-known instruction instances, protocols, structures and techniques have not been shown in detail in order not to obfuscate the description.

Overview

When DAS vertical seismic profile (VSP) data sets are collected with wireline deployed fiber optic cables, there are locations on the well (i.e. ranges of channels) where the seismic signal rings. These ringing signals mask the actual VSP data that is to be collected and analyzed. In wireline DAS surveys, coupling issues can cause the DAS fiber optic cable to resonate at certain frequencies depending on factors like depth and local well conditions. Consequently, coherent noise can be present in DAS shot gathers. Such noise can be observed both on pilot trace correlated and uncorrelated DAS shot gather data. Mitigating such coherent noise can be challenging. The coherent noise caused by coupling issues in the DAS fiber optic cable can be described as cable slapping and/or zig zag noise.

Coherent noise can be mitigated by identifying and muting out the regions that include coherent noise in the DAS shot gather data. The identified regions can include one or more channels with associated traces. For each trace associated with a channel that is within a region that includes coherent noise, a continuous wavelet transform (CWT) can be applied to generate time versus scale (wavelet domain) analysis plots that display the magnitude of wavelet coefficients for the trace. Thus, the chosen traces to which CWT is applied can be the traces where visually coherent noise is identified. The CWT can additionally be applied to traces of nearby channels where less visually coherent noise is identified, resulting in reference wavelet coefficients.

For each identified region, the noise of the corresponding traces can then be suppressed by zeroing out or reducing the magnitude of the relevant (noise) wavelet coefficients. Wavelet transform coefficients can be determined as relevant by comparing the wavelet coefficients for the corresponding traces to the reference wavelet coefficients for those traces. The adjusted coefficients can then be transformed back using the inverse CWT to obtain a noise mitigated DAS trace in the time domain. These operations can be repeated over all traces of interest, thereby resulting in noise mitigated shot gathers.

Example Illustrations

Figure 1:
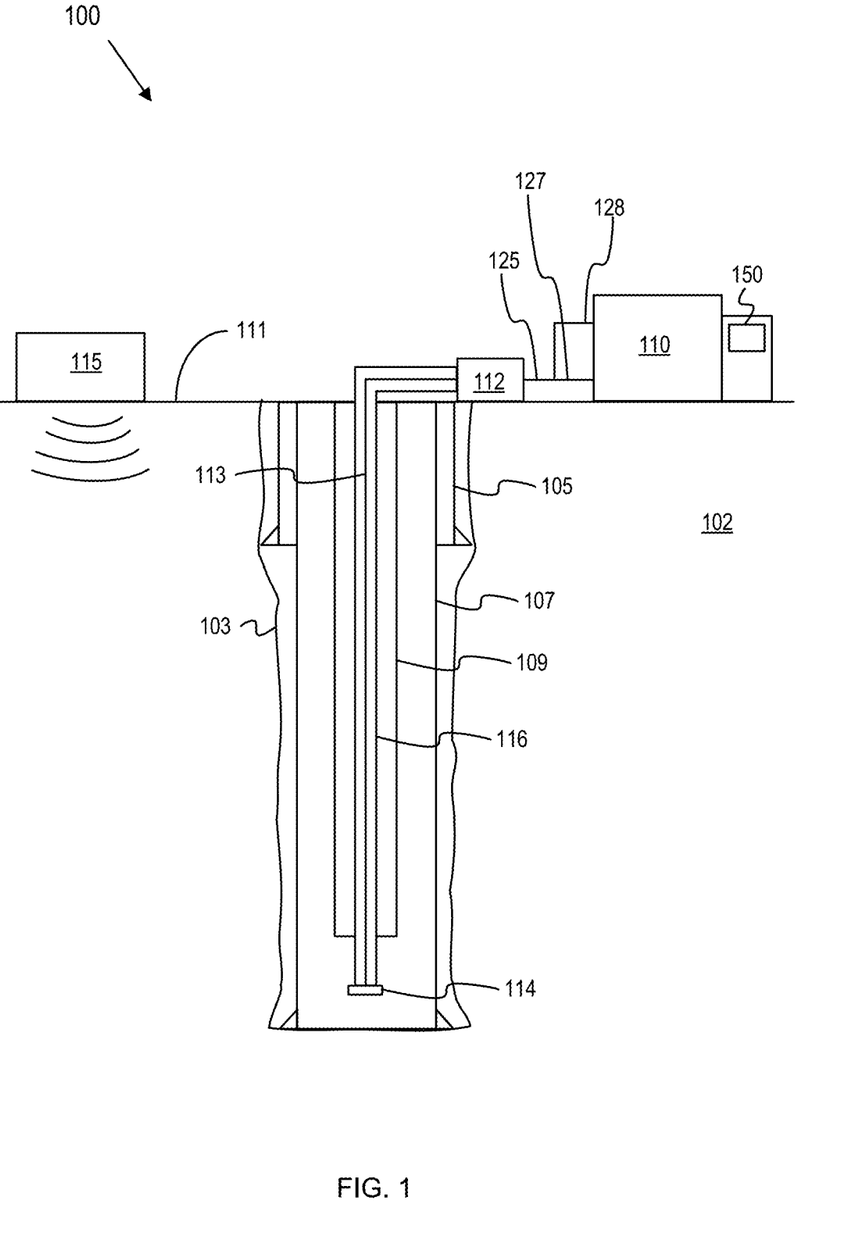
FIG. 1 depicts an example well logging system that includes a retrievable wireline or tubing that includes a fiber optic cable for DAS

FIG. 1 depicts an example well logging system with a retrievable wireline or tubing that includes a fiber optic cable for DAS. A well logging system 100 can detect seismic disturbances generated by a seismic source 115 on an earth surface 111. A borehole 103 has been drilled in a subterranean formation 102. The borehole 103 can be a completion well (i.e. a well ready for production or injection following a drilling process) having a surface casing 105, a production casing 107 inside the surface casing 105, and a tubing 109 inside the production casing 107. In some embodiments, the tubing 109 can be a casing string, production string, a coiled tubing, a work string, a production tubing, etc. The well logging system 100 includes a wireline cable 116 that includes optical fiber 113 in the tubing 109 and a DAS signal interrogation system 112 that includes a DAS interrogator. The wireline cable 116 can be an armored wireline, slickline, etc.

In some embodiments, the DAS interrogator in the DAS signal interrogation system 112 can be directly coupled to the optical fiber 113. Alternatively, the DAS interrogator can be coupled to a fiber stretcher module in the DAS signal interrogation system 112, wherein the fiber stretcher module is coupled to the optical fiber 113. The DAS signal interrogation system 112 can receive DAS measurement values taken from and/or transmitted along the length of the optical fiber 113. In addition, the DAS signal interrogation system 112 can receive DAS measurement values from a bottom hole gauge carrier 114 attached to the bottom of the optical fiber 113 that transmits measurements through the optical fiber 113. In some embodiments, the bottom hole gauge carrier 114 can include a pressure temperature gauge and can be inside of or replaced by a wireline tool, formation testing tool, etc.

DAS measurement values transmitted through the optical fiber 113 can be sent to the DAS signal interrogation system 112 at the surface. The DAS interrogator of the DAS signal interrogation system 112 can be electrically connected to a digitizer to convert optically-transmitted measurements into digitized measurements. A computing device 110 can collect the digitized measurements from the DAS signal interrogation system 112 using a connector 125. The computing device can have one or more processors and a memory device to analyze the measurements and graphically represent analysis results on the display device 150. In addition, the computing device 110 can communicate with components attached to the optical fiber 113. For example, the computing device 110 can send control signals to the bottom hole gauge carrier 114 to modify gauge measurement parameters. Additionally, in some embodiments, at least one processor and memory device can be located downhole for the same purposes. With the optical fiber 113 positioned inside a portion of the borehole 103, the DAS signal interrogation system 112 can obtain information associated with the subterranean formation 102 based on seismic/acoustic disturbances (e.g. seismic disturbances caused by the seismic source 115). Relative to other positions, fixing the optical fiber 113 to the outer perimeter of the tubing 109 can increase the sensitivity of DAS measurements to changes in the annular region between the production casing 107 and the tubing 109. (e.g. changes in fluid flow down the tubing 109, changes in fluid composition down the tubing 109, etc.).

The connector 125 includes a first connector output 127 and a second connector output 128. The first connector output 127 electrically connects the DAS signal interrogation system 112 to a first digitizer in the computing device 110. The second connector output 128 electrically connects the DAS signal interrogation system 112 to a second digitizer in the computing device 110. A signal transmitted by or through the optical fiber 113 in the tubing 109 can be simultaneously received by both the first digitizer and the second digitizer in the computing device 110. In alternative embodiments, the first digitizer and the second digitizer can be in separate computing devices.

Figure 2:
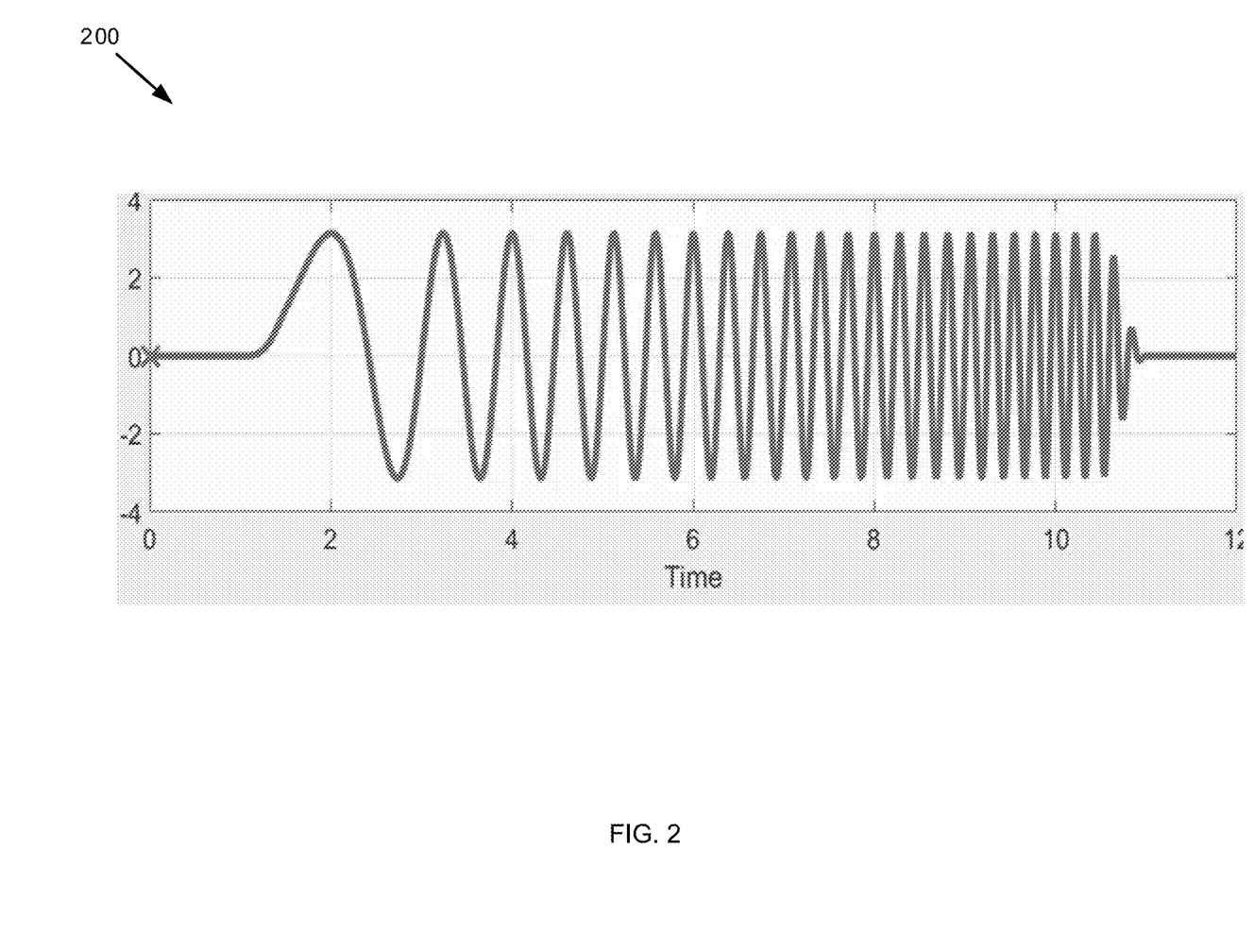
FIG. 2 depicts an example sweep signal to be input into the formation for DAS by an optical fiber.

FIG. 2 depicts an example source sweep signal to be input into the formation. The source sweep signal can be an example of a signal emitted by a seismic source, such as a Vibroseis truck. This source sweep signal propagates through the formation and a resulting signal is collected by the DAS system. The sweep signal 200 is initially at a very low frequency and over time the frequency increases. In this example, the sweep signal 200 is an up sweep in which the frequency increases over time. In other embodiments, the sweep signal can be a down sweep in which the frequency decreases over time. The sweep signal 200 is depicted as a linear sweep but can also be a nonlinear sweep, for example a logarithmic sweep.

Figure 3:
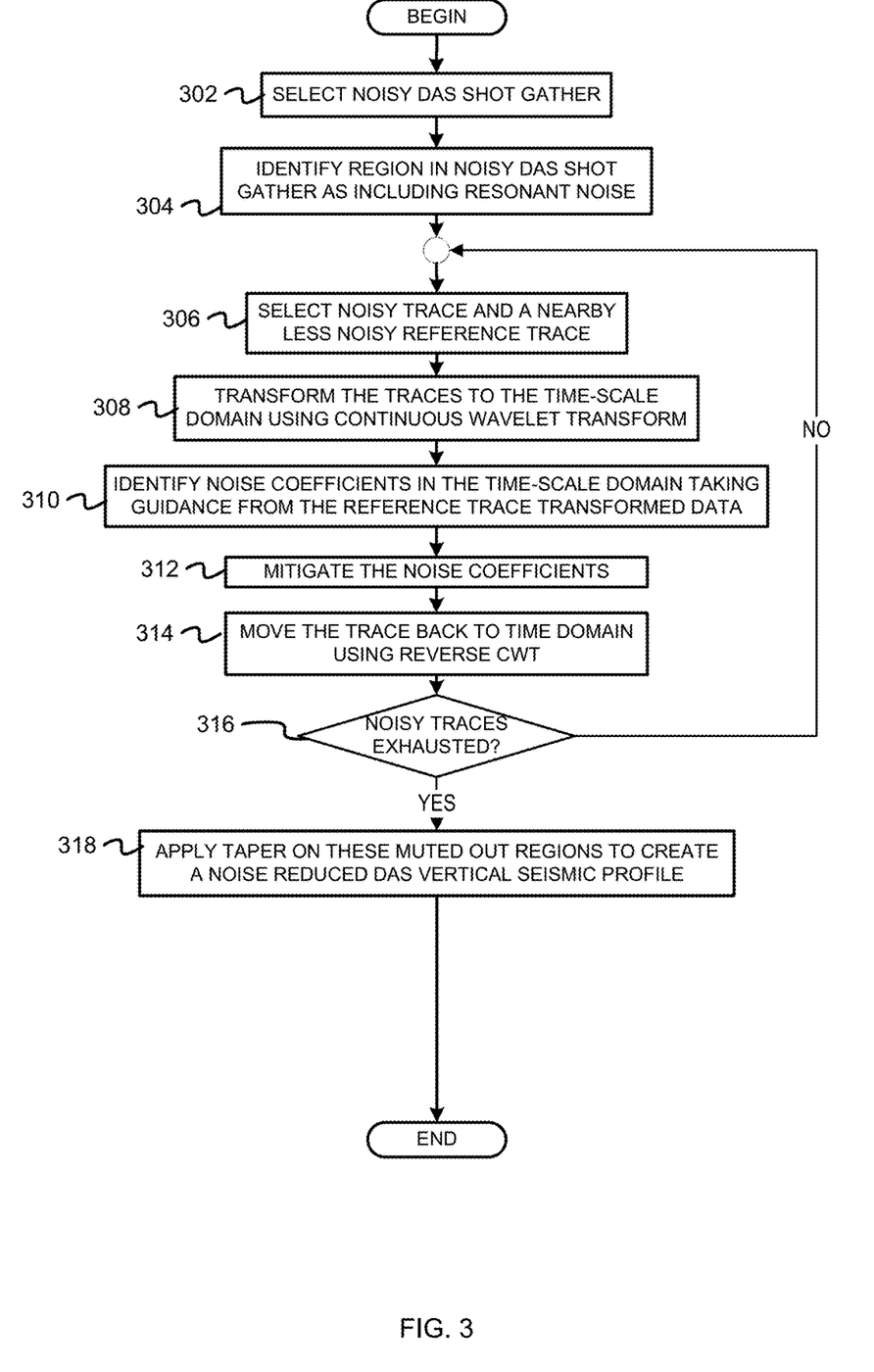
FIG. 3 depicts a flowchart of operations for reducing coherent noise in a DAS VSP and using the reduced noise DAS VSP.

FIG. 3 depicts a flowchart of operations for reducing coherent noise in a DAS VSP and using the reduced noise DAS VSP to guide a hydrocarbon recovery operation. The flowchart includes operations that can be performed by hardware, software, firmware, or a combination thereof. For example, at least some of the operations can be performed by a processor executing program code or instructions.

Figure 4:
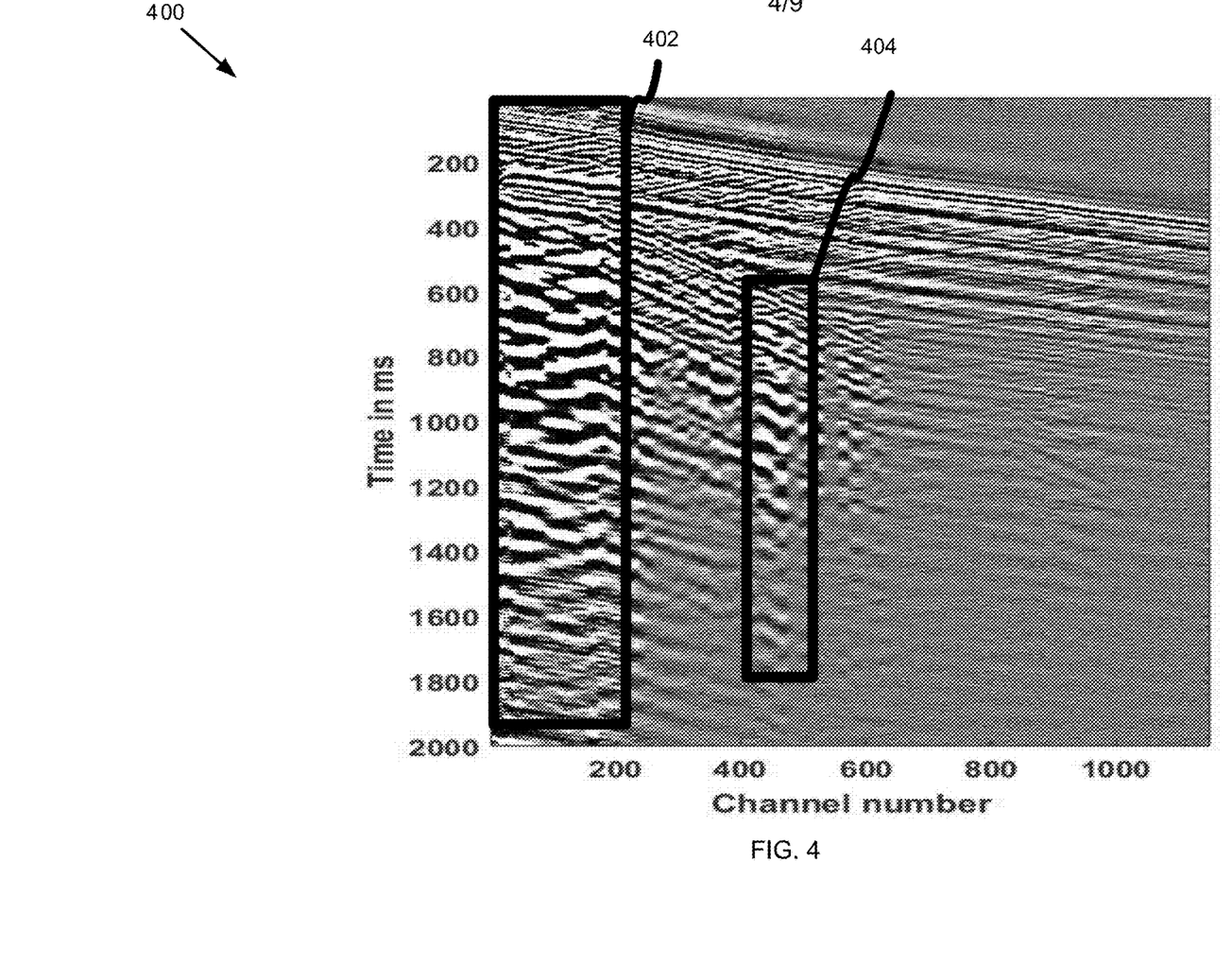
FIG. 4 depicts a DAS shot gather that includes coherent noise.

Prior to the operations depicted in FIG. 3, an optical fiber(s) that is configured for DAS is positioned in a wellbore. The optical fiber(s) detects DAS raw seismic data from which a noisy DAS shot gather is selected (block 302). The DAS shot gather corresponds to at least one channel within a particular region of the wellbore and a time interval. The channels and time interval can be manually selected from the DAS raw seismic data in proximity to a known seismic event so that the resulting noisy DAS shot gather has a higher quality. To illustrate, FIG. 4 depicts a DAS shot gather 400 that includes coherent noise within regions 402 and 404.

A region in the noisy DAS shot gather is identified as including coherent noise (block 304). A region can be identified by a machine and/or visual inspection. Visual inspection would search for a zig zag pattern or other prominent visual pattern. Additional types of noise can cause different patterns of noise that can also be identified by visual inspection. A machine can train a model to detect noisy regions using DAS shot gathers with and without noise as training data. To illustrate, with reference to FIG. 4, the regions 402 and 404 include the zig zag pattern. After the region has been identified, a noisy trace in a channel in the identified region along with a nearby less noisy trace are selected (block 306). The less noisy trace can be selected by visual inspection from a region having less visually apparent coherent noise, for example a region that avoids the zig zag pattern. In other embodiments, a machine can select the closest trace to the noisy trace not inside the identified region. For example, with reference to FIG. 4, a channel just outside the right edge or just inside the right edge of region 402 can be selected as a less noisy trace corresponding to a noisy trace in the identified region 402.

The selected traces are transformed from the time domain to the wavelet (time versus scale) domain using continuous wavelet transform (CWT) (block 308). For each trace, the CWT can be computed as a discrete approximation of the following integral:

$$C(a, x(t), \psi(t)) := \frac{1}{a^{1/2}} \int_{-\infty}^{\infty} x(t)\psi(t/a)dt$$

Figure 5:
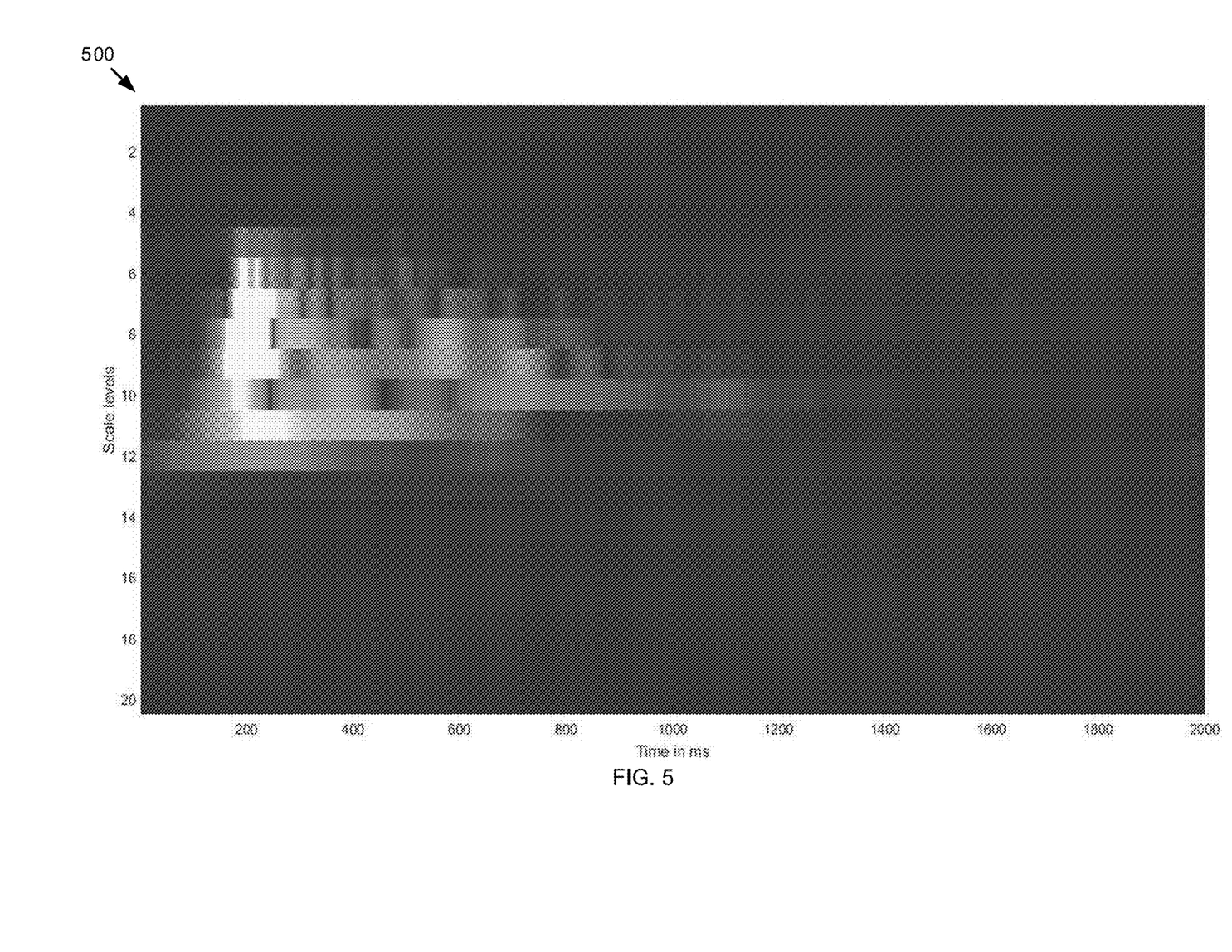
FIG. 5 depicts an example wavelet transform coefficient plot for a given trace from the noisy shot gather.

Here, α>0 is the scale parameter, x(t) is a selected trace, and ψ(t) is a mother wavelet. Any number of mother wavelets can be chosen depending on the statistics of the seismic data, including the Daubechies wavelet, the Meyer wavelet, the Poisson wavelet, the Morlet wavelet, etc. The CWT can be efficiently computed using Fast Fourier Transform based methods. Each value indicated by the above integral corresponding to a particular scale and trace is a wavelet "coefficient." To illustrate, FIG. 5 depicts an example wavelet transform coefficient plot 500 for a given trace from the noisy shot gather. The plot displays the magnitude of the wavelet coefficients for various times and scales. There is a visual spike in the magnitude of coefficients around 200 to 400 milliseconds on the time axis, and 5 to 11 on the scale axis. This visual spike could be an indication that these coefficients correspond to noise.

The noise coefficients for the noisy trace in the wavelet domain are identified based on the reference trace transformed data (block 310). The noise coefficients can be identified by visual inspection of the noisy trace and reference trace in the wavelet domain. There are other methods of identifying the noise coefficients in the wavelet domain. As examples, the noise coefficients can be identified as having a magnitude above a certain threshold, where the threshold is based on the magnitude of the coefficients for the reference trace, or a model of low or high complexity can be trained to identify outlier coefficients with respect to the reference trace coefficients.

The identified noise coefficients at block 310 are subsequently mitigated (block 312). Mitigation can include zeroing out and/or reducing the magnitude of the noise coefficients. Reducing the magnitude of the noise wavelet coefficients can comprise using a soft thresholding function for noise wavelet coefficients above a threshold magnitude. The mitigation of identified noise wavelet coefficients can depend on the wavelet coefficients for the reference trace.

The denoised trace in the wavelet domain is then moved back to the time domain using the inverse CWT (block 314). The inverse CWT can be computed as a discrete approximation to the inverse of the CWT integral expressed by:

$$C_\psi^{-1} \int_{-\infty}^{\infty}\int_{-\infty}^{\infty} C(a, x(t), \psi(t)) \frac{1}{|a|^{1/2}} \tilde{\psi}\left(\frac{t-b}{a}\right) db \frac{da}{a^2}$$

Here, $\tilde{\psi}(t)$ is the dual function to ψ(t), $$C_\psi = \int_{-\infty}^{\infty} \frac{\overline{\hat{\psi}(\omega)}\hat{\tilde{\psi}}(\omega)}{|\omega|} d\omega$$

(the mother wavelet ψ(t) is chosen so that this integral is finite) and $\hat{\psi}(\omega)$ is the Fourier transform. Further, the inverse CWT can be efficiently computed using Fast Fourier Transform based methods.

Once the noise reducing operations in blocks 306, 308, 310, 312, and 314 have been applied to the currently selected traces, a determination is made of whether the noisy traces are exhausted by checking if the traces in the identified region have all been denoised (block 316). If the noisy traces are not exhausted, operations of the flowchart return to block 306 where another noisy trace and nearby less noisy reference trace are selected. Otherwise, the noisy traces are exhausted and the coherent noise has been mitigated.

Figure 6:
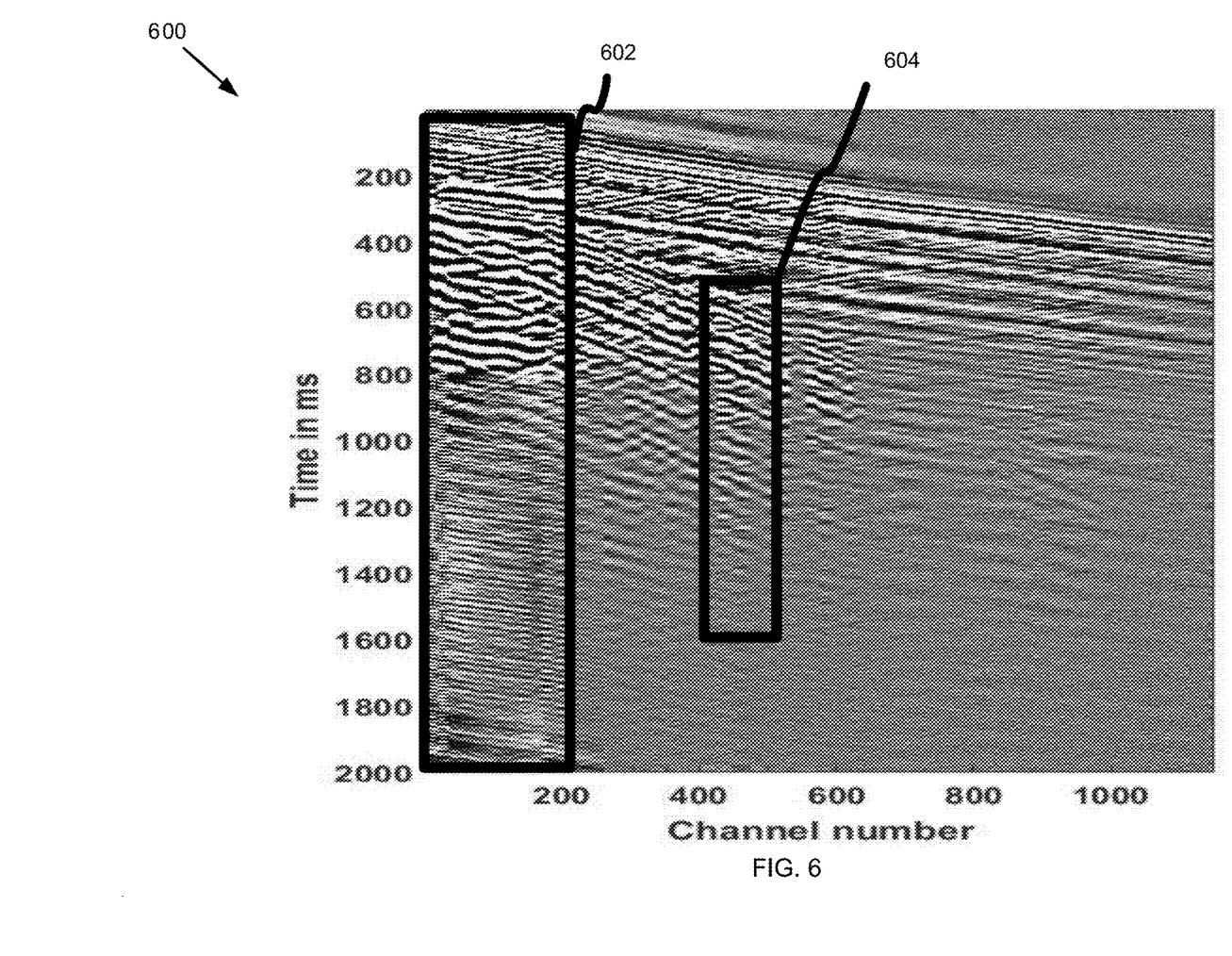
FIG. 6 depicts a DAS shot gather after reduction in coherent noise.

To illustrate the noise reducing effect of operations in blocks 306, 308, 310, 312, and 314, FIG. 6 depicts a DAS shot gather after reduction in coherent noise. The DAS shot gather includes regions 602 and 604 that correspond to regions 402 and 404 of FIG. 4. As shown, the coherent noise in the regions 602 and 604 has been mitigated in comparison to the regions 402 and 404 of FIG. 4. If the noisy traces are exhausted, operations of the flowchart continue at block 318.

Tapers are applied to each of the denoised regions to create a noise reduced DAS vertical seismic profile (block 318). The tapers can reduce the magnitude of values in the DAS shot gather and can additionally convolve the data corresponding to the muted region with a mollifier to smooth out irregularity caused by noise reduction in blocks 308, 310, 312, and 314.

The subsurface formation is evaluated based on the noise reduced DAS vertical seismic profile (VSP) (block 320). The VSP can indicate more specific details of downhole obstructions, the presence of hydrocarbons, etc. with higher precision than surface measurements. Finally, a hydrocarbon recovery operation based on evaluation of the subsurface formation can be performed (322). Examples of a hydrocarbon recovery operation can include hydraulic fracturing, perforation operations, well flooding and/or additional drilling on the current wellbore, drilling a new wellbore, etc.

Figure 7:
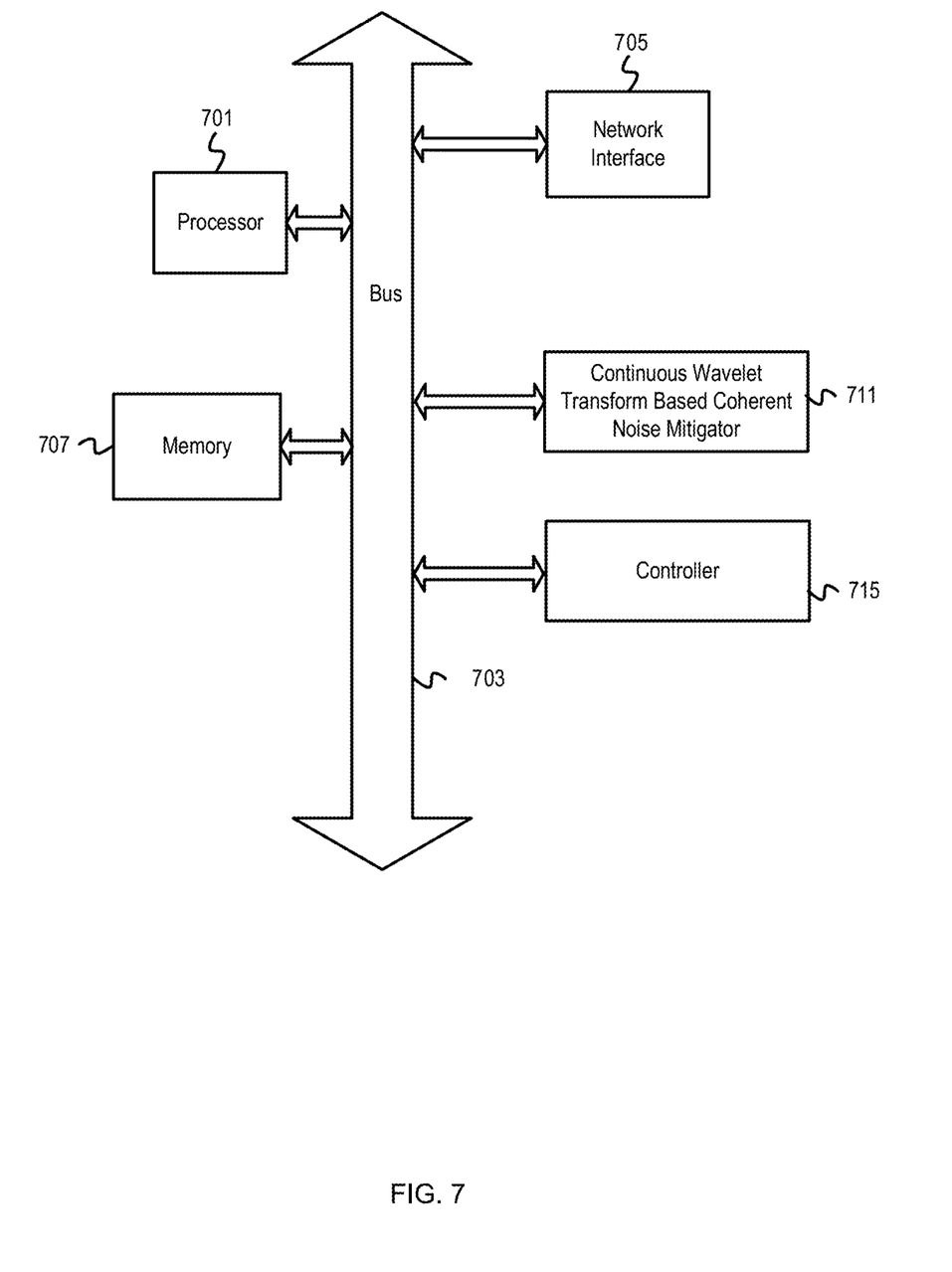
FIG. 7 depicts an example computer with a continuous wavelet transform (CWT) based coherent noise mitigator and a controller.

FIG. 7 depicts an example computer with a CWT based coherent noise mitigator. The computer includes a processor 701. The computer includes memory 707, a bus 703, and a network interface 705 (e.g., a wireless interface, interface for a wired connection, etc.).

The computer also includes a continuous wavelet transform (CWT) based coherent noise mitigator 711 and a controller 715. The CWT based coherent noise mitigator 711 can mitigate the noise in a DAS shot gather as described variously above. The noise mitigated DAS shot gathers produced by CWT based coherent noise mitigator 711 can aid the controller 715 in performing various hydrocarbon recovery operations based on the formation evaluation (as described above). Any one of the previously described functionalities may be partially (or entirely) implemented in hardware and/or on the processor 701. For example, the functionality may be implemented with an application specific integrated circuit, in logic implemented in the processor 701, in a co-processor on a peripheral device or card, etc. Further, realizations may include fewer or additional components not illustrated in FIG. 7 (e.g., video cards, audio cards, additional network interfaces, peripheral devices, etc.). The processor 701 and the network interface 705 are coupled to the bus 703. Although illustrated as being coupled to the bus 703, the memory 707 may be coupled to the processor 701.

The flowcharts are provided to aid in understanding the illustrations and are not to be used to limit scope of the claims. The flowcharts depict example operations that can vary within the scope of the claims. Additional operations may be performed; fewer operations may be performed; the operations may be performed in parallel; and the operations may be performed in a different order. It will be understood that each block of the flowchart illustrations and/or block diagrams, and combinations of blocks in the flowchart illustrations and/or block diagrams, can be implemented by program code. The program code may be provided to a processor of a general purpose computer, special purpose computer, or other programmable machine or apparatus.

It will be understood that each block of the flowchart illustrations and/or block diagrams, and combinations of blocks in the flowchart illustrations and/or block diagrams, can be implemented by program code. The program code may be provided to a processor of a general purpose computer, special purpose computer, or other programmable machine or apparatus.

As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Any combination of one or more machine readable medium(s) may be utilized. The machine-readable medium may be a machine-readable signal medium or a machine-readable storage medium. A machine-readable storage medium may be, for example, but not limited to, a system, apparatus, or device, that employs any one of or combination of electronic, magnetic, optical, electromagnetic, infrared, or semiconductor technology to store program code. More specific examples (a non-exhaustive list) of the machine-readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine-readable storage medium may be any tangible medium that can contain, or store a program for use by or in connection with an instruction execution system, apparatus, or device. A machine-readable storage medium is not a machine-readable signal medium.

A machine-readable signal medium may include a propagated data signal with machine readable program code embodied therein, for example, in baseband or as part of a carrier wave. Such a propagated signal may take any of a variety of forms, including, but not limited to, electromagnetic, optical, or any suitable combination thereof. A machine-readable signal medium may be any machine-readable medium that is not a machine-readable storage medium and that can communicate, propagate, or transport a program for use by or in connection with an instruction execution system, apparatus, or device. The memory 707 may be system memory or any one or more of the above already described possible realizations of machine-readable media.

The program code/instructions may also be stored in a machine-readable medium that can direct a machine to function in a particular manner, such that the instructions stored in the machine-readable medium produce an article of manufacture including instructions which implement the function/act specified in the flowchart and/or block diagram block or blocks.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure. In general, structures and functionality presented as separate components in the example configurations may be implemented as a combined structure or component. Similarly, structures and functionality presented as a single component may be implemented as separate components. These and other variations, modifications, additions, and improvements may fall within the scope of the disclosure.

Figure 8:
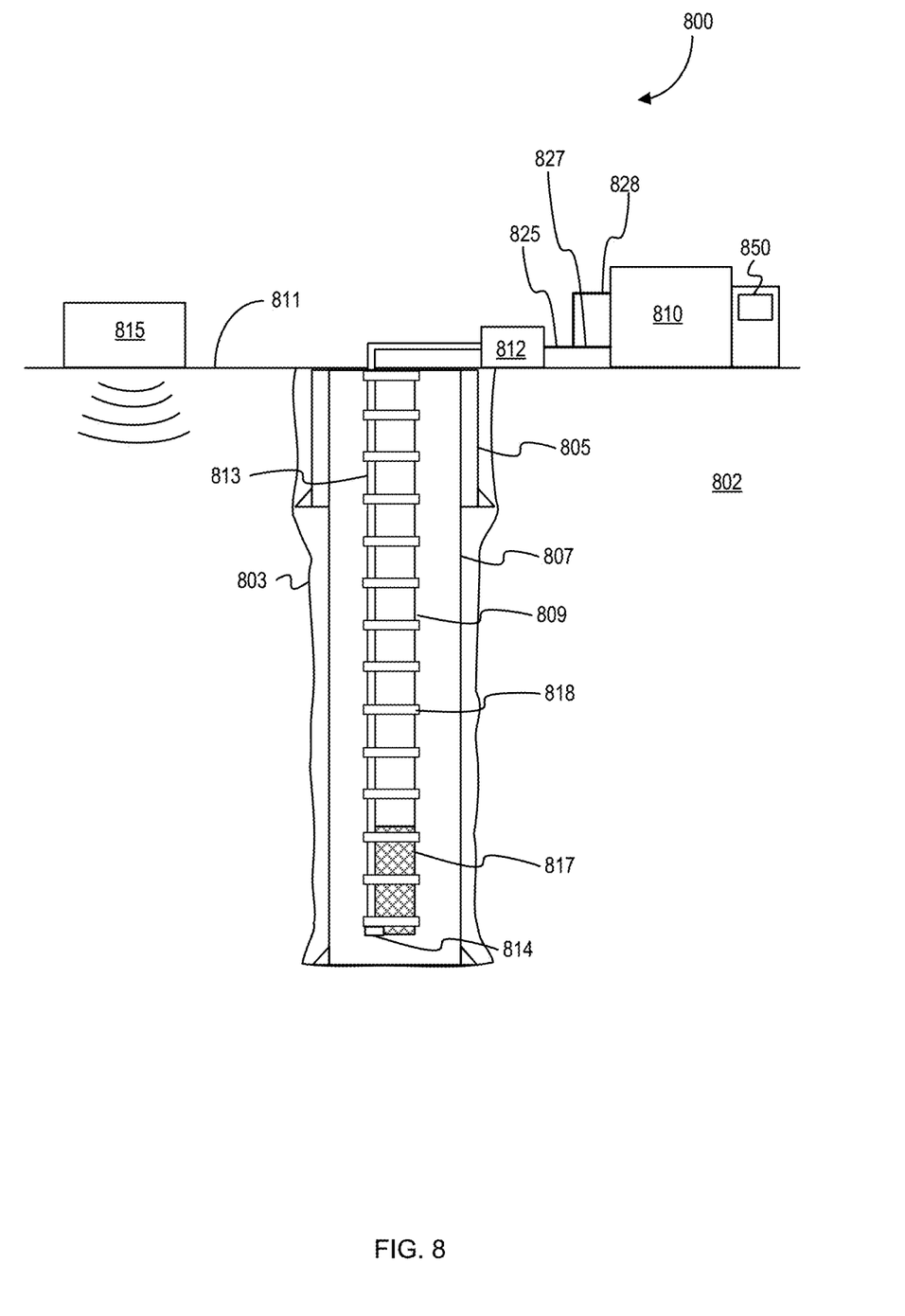
FIG. 8 depicts an example well logging system that includes a fiber optic cable for DAS that is fixed to the outside of a tubing within a cased borehole.

FIG. 8 depicts an example well logging system that includes a fiber optic cable for DAS that is fixed to the outside of a tubing within a cased borehole. A well logging system 800 can detect seismic disturbances generated by a seismic source 815 on an earth surface 811. A borehole 803 has been drilled in the subterranean formation 802. The borehole 803 can be a completion well (i.e. a well ready for production or injection following a drilling process) having a surface casing 805, a production casing 807 inside the surface casing 805, and a tubing 809 inside the production casing 807. In some embodiments, the tubing 809 can be a casing string, production string, a coiled tubing, a work string, etc. The well logging system 800 includes an optical fiber 813 that is fixed to the outer perimeter of the tubing 809. Cross-coupling protectors such as a cross-coupling protector 818 can be used to fix the optical fiber 813 to the tubing 809. In addition, a tubing tail 817 can also be fixed to the optical fiber 813 and extend below the bottom of the tubing 809.

In some embodiments, the optical fiber can be connected to a DAS signal interrogation system 812 that includes a DAS interrogator. The DAS interrogator in the DAS signal interrogation system 812 can be directly coupled to the optical fiber 813. Alternatively, the DAS interrogator can be coupled to a fiber stretcher module in the DAS signal interrogation system 812, wherein the fiber stretcher module is coupled to the optical fiber 813. The DAS signal interrogation system 812 can receive DAS measurement values taken from and/or transmitted along the length of the optical fiber 813. In addition, the DAS signal interrogation system 812 can receive DAS measurement values from a bottom hole gauge carrier 814 attached to the bottom of the optical fiber 813 that transmits measurements through the optical fiber 813. In some embodiments, the bottom hole gauge carrier 814 can include a pressure temperature gauge and can be inside of or replaced by a wireline tool, formation testing tool, etc.

DAS measurement values transmitted through the optical fiber 813 can be sent to the DAS signal interrogation system 812 at the surface. The DAS interrogator of the DAS signal interrogation system 812 can be electrically connected to a digitizer to convert optically-transmitted measurements into digitized measurements. A computing device 810 can collect the digitized measurements from the DAS signal interrogation system 812 using a connector 825. The computing device can have one or more processors and a memory device to analyze the measurements and graphically represent analysis results on the display device 850. In addition, the computing device 810 can communicate with components attached to the optical fiber 813. For example, the computing device 810 can send control signals to the bottom hole gauge carrier 814 to modify gauge measurement parameters. Additionally, in some embodiments, at least one processor and memory device can be located downhole for the same purposes. With the optical fiber 813 positioned inside a portion of the borehole 803, the DAS signal interrogation system 812 can obtain information associated with the subterranean formation 802 based on seismic/acoustic disturbances (e.g. seismic disturbances caused by the seismic source 815). Relative to other positions, fixing the optical fiber 813 to the outer perimeter of the tubing 809 can increase the sensitivity of DAS measurements to changes in the annular region between the production casing 807 and the tubing 809.

The connector 825 includes a first connector output 827 and a second connector output 828. The first connector output 827 electrically connects the DAS signal interrogation system 812 to a first digitizer in the computing device 810. The second connector output 828 electrically connects the DAS signal interrogation system 812 to a second digitizer in the computing device 810. A signal transmitted by or through the optical fiber 813 fixed to the outer perimeter of the tubing 809 can be simultaneously received by both the first digitizer and the second digitizer in the computing device 810. In alternative embodiments, the first digitizer and the second digitizer can be separate computing devices.

Figure 9:
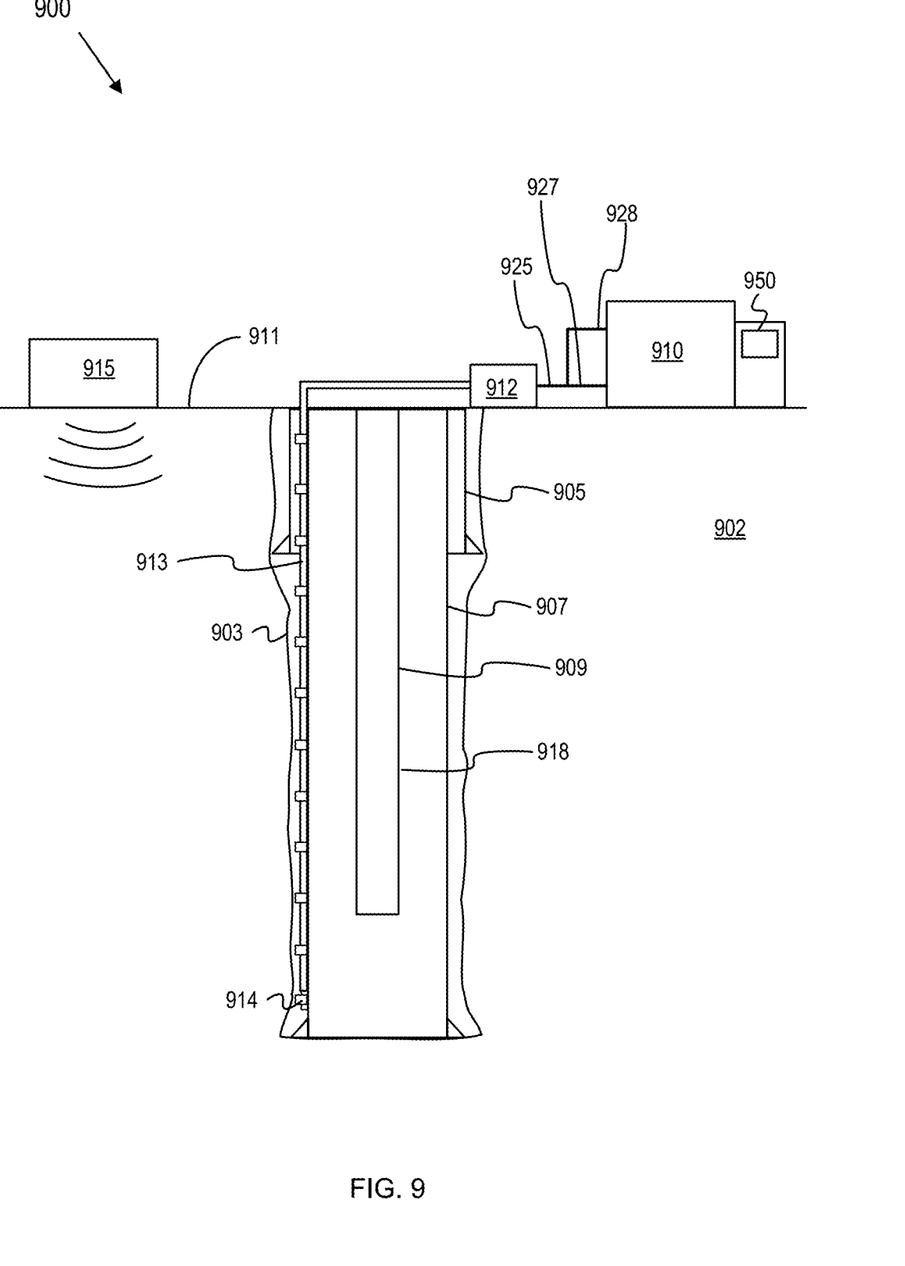
FIG. 9 depicts an example well logging system that includes a fiber optic cable for DAS fixed to the outside of the casing of the cased borehole.

FIG. 9 depicts an example well logging system that includes a fiber optic cable for DAS fixed to the outside of the casing of the cased borehole. A well logging system 900 can detect seismic disturbances generated by a seismic source 915 on an earth surface 911. A borehole 903 has been drilled in the subterranean formation 902. The borehole 903 can be a completion well (i.e. a well ready for production or injection following a drilling process) having a surface casing 905, a production casing 907 inside the surface casing 905, and a tubing 909 inside the production casing 907. In some embodiments, the tubing 909 can be a casing string, production string, a coiled tubing, a work string, etc. The well logging system 900 includes an optical fiber 913 that is fixed to the outer perimeter of the production casing 907. Cross-coupling protectors such as a cross-coupling protector 918 can be used to fix the optical fiber 913 to the outer perimeter of the production casing 907.

In some embodiments, the optical fiber can be connected to a DAS signal interrogation system 912 that includes a DAS interrogator. The DAS interrogator in the DAS signal interrogation system 912 can be directly coupled to the optical fiber 913. Alternatively, the DAS interrogator can be coupled to a fiber stretcher module in the DAS signal interrogation system 912, wherein the fiber stretcher module is coupled to the optical fiber 913. The DAS signal interrogation system 912 can receive DAS measurement values taken from and/or transmitted along the length of the optical fiber 913. In addition, the DAS signal interrogation system 912 can receive DAS measurement values from a bottom hole gauge carrier 914 attached to the bottom of the optical fiber 913 that transmits measurements through the optical fiber 913. In some embodiments, the bottom hole gauge carrier 914 can be attached to the bottom of the optical fiber 913 and can include a pressure temperature gauge and can be inside of or replaced by a wireline tool, formation testing tool, etc.

DAS measurement values transmitted through the optical fiber 913 can be sent to the DAS signal interrogation system 912 at the surface. The DAS interrogator of the DAS signal interrogation system 912 can be electrically connected to a digitizer to convert optically-transmitted measurements into digitized measurements. A computing device 910 can collect the digitized measurements from the DAS signal interrogation system 912 using a connector 925. The computing device can have one or more processors and a memory device to analyze the measurements and graphically represent analysis results on the display device 950. In addition, the computing device 910 can communicate with components attached to the optical fiber 913. For example, the computing device 910 can send control signals to the bottom hole gauge carrier 914 to modify gauge measurement parameters. Additionally, in some embodiments, at least one processor and memory device can be located downhole for the same purposes. With the optical fiber 913 positioned inside a portion of the borehole 903, the DAS signal interrogation system 912 can obtain information associated with the subterranean formation 902 based on seismic/acoustic disturbances (e.g. seismic disturbances caused by the seismic source 915). Relative to other positions, fixing the optical fiber 913 to the outer perimeter of the production casing 907 can increase the sensitivity of DAS measurements to changes in the formation.

The he connector 925 includes a first connector output 927 and a second connector output 928. The first connector output 927 electrically connects the DAS signal interrogation system 812 to a first digitizer in the computing device 910. The second connector output 928 electrically connects the DAS signal interrogation system 812 to a second digitizer in the computing device 910. A signal transmitted by or through the optical fiber 913 fixed to the production casing 907 can be simultaneously received by both the first digitizer and the second digitizer in the computing device 910. In alternative embodiments, the first digitizer and the second digitizer can be separate computing devices.

In any of the well logging systems of FIGS. 1, 8 and 9, the seismic waves initially incident on the optical fibers are referred to as first breaks. In some examples, these first breaks may produce resonant noise in the seismic data such as a ringing or zig-zag noise. The resonant noise may be due to reverberation of the optical fiber resulting from the seismic waves incident on the optical fiber where it is not secured to the wellbore, among other reasons. The resonant noise may mask seismic data associated with determining the rock properties in geologic formation based on the seismic data.

As used herein, the term "or" is inclusive unless otherwise explicitly noted. Thus, the phrase "at least one of A, B, or C" is satisfied by any element from the set {A, B, C} or any combination thereof, including multiples of any element.

EXAMPLE EMBODIMENTS

Example embodiments can include the following:

Embodiment 1

A method comprises denoising a first region of a seismic profile having coherent noise, wherein denoising the first region comprises identifying a first adjacent channel to the first region that is less noisy than the first region, converting, from a time domain to a wavelet domain, traces of a set of channels of a plurality of channels within the first region and a trace of the first adjacent channel, modifying the wavelet domain traces of the set of channels to suppress the coherent noise based, at least in part, on a comparison of the wavelet domain traces of the set of channels and the wavelet domain trace of the first adjacent channel, and applying an inverse wavelet transform to the modified wavelet domain traces of the set of channels to generate time domain denoised traces of the set of channels, and creating a reduced noise seismic profile based, at least in part, on the denoised traces of the set of channels.

Embodiment 2

The method of embodiment 1, wherein modifying the wavelet domain traces of the set of channels comprises selecting a set of coefficients of the wavelet domain traces of the set of channels and reducing, in the wavelet domain, magnitudes of the set of coefficients.

Embodiment 3

The method of any of embodiments 1-2, wherein the selection of the set of coefficients is based, at least in part, on the wavelet domain trace of the first adjacent channel.

Embodiment 4

The method of any of embodiments 1-3, further comprising applying a taper to the denoised first region.

Embodiment 5

The method of any of embodiments 1-4, further comprising evaluating at least one characteristic of a subsurface formation based on the reduced noise seismic profile.

Embodiment 6

The method of any of embodiments 1-5, further comprising identifying from the seismic profile the first region as having coherent noise.

Embodiment 7

The method of any of embodiments 1-6, further comprising identifying the set of channels of the plurality of channels within the first region.

Embodiment 8

A system comprising a processor and a machine-readable medium having instructions stored thereon that are executable by the processor to cause the system to, identify a first adjacent channel to a first region that is less noisy than the first region, wherein the first region is indicated in a seismic profile and the first region has coherent noise, convert, from a time domain to a wavelet domain, traces of a set of channels of a plurality of channels within the first region and a trace of the first adjacent channel, wherein a plurality of channels within the first region include the set of channels, modify the wavelet domain traces of the set of channels to suppress the coherent noise based, at least in part, on a comparison of the wavelet domain traces of the set of channels and the wavelet domain trace of the first adjacent channel, apply an inverse wavelet transform to the modified wavelet domain traces of the set of channels to generate time domain denoised traces of the set of channels, and create a reduced noise seismic profile based, at least in part, on the denoised traces of the set of channels.

Embodiment 9

The system of embodiment 8, wherein the instructions to modify the wavelet domain traces of the set of channels comprise instructions executable by the processor to cause the system to select a set of coefficients of the wavelet domain traces of the set of channels and reduce, in the wavelet domain, magnitudes of the set of coefficients.

Embodiment 10

The system of any of embodiments 8-9, wherein the instructions to select the set of coefficients comprise instructions executable by the processor to cause the system to select the set of coefficients based, at least in part, on the wavelet domain trace of the first adjacent channel.

Embodiment 11

The system of any of embodiments 8-10, wherein the machine-readable medium further has stored thereon instructions executable by the processor to cause the system to evaluate at least one characteristic of a subsurface formation based on the reduced noise seismic profile.

Embodiment 12

The system of any of embodiments 8-11, wherein the machine-readable medium further has stored thereon instructions executable by the processor to cause the system to apply a taper to the first region.

Embodiment 13

The system of any of embodiments 8-12, wherein the machine-readable medium further has stored thereon instructions executable by the processor to cause the system to identify the seismic profile from the first region having coherent noise.

Embodiment 14

A non-transitory, machine-readable medium having program code stored thereon that is executable by a machine, the program code comprising instructions to identify a first adjacent channel to a first region that is less noisy than the first region, wherein the first region is indicated in a seismic profile and the first region has coherent noise, convert, from a time domain to a wavelet domain, traces of a set of channels of a plurality of channels within the first region and a trace of the first adjacent channel, modify the wavelet domain traces of the set of channels to suppress the coherent noise based, at least in part, on a comparison of the wavelet domain traces of the set of channels and the wavelet domain trace of the first adjacent channel, apply an inverse wavelet transform to the modified wavelet domain traces of the set of channels to generate time domain denoised traces of the set of channels, and create a reduced noise seismic profile based, at least in part, on the denoised traces of the set of channels.

Embodiment 15

The non-transitory, machine-readable medium of embodiment 14, wherein the instructions to modify the wavelet domain traces of the set of channels comprise instructions to select a set of coefficients of the wavelet domain traces of the set of channels and reduce, in the wavelet domain, magnitudes of the set of coefficients.

Embodiment 16

The non-transitory, machine-readable medium of any of embodiments 14-15, wherein the instructions to select the set of coefficients comprise instructions to select the set of coefficients based, at least in part, on the wavelet domain trace of the first adjacent channel.

Embodiment 17

The non-transitory, machine-readable medium of any of embodiments 14-16, wherein the program code further comprises instructions to apply a taper to the first region.

Embodiment 18

The non-transitory, machine-readable medium of any of embodiments 14-17, wherein the program code further comprises instructions to evaluate at least one characteristic of a subsurface formation based on the reduced noise seismic profile.

Embodiment 19

The non-transitory, machine-readable medium of any of embodiments 14-18, wherein the program code further comprises instructions to identify the seismic profile from the first region based, at least in part, on the first region having coherent noise.

Embodiment 20

The non-transitory, machine-readable medium of any of embodiments 14-19, wherein the program code further comprises instructions to identify the set of channels of the plurality of channels within the first region.

What is claimed is:

1. A method comprising:
   denoising a first region of a seismic profile having coherent noise, wherein denoising the first region comprises,
      identifying a first adjacent channel to the first region that is less noisy than the first region;
      converting, from a time domain to a wavelet domain, traces of a set of channels of a plurality of channels within the first region and a trace of the first adjacent channel;
      modifying the wavelet domain traces of the set of channels to suppress the coherent noise based, at least in part, on a comparison of the wavelet domain traces of the set of channels and the wavelet domain trace of the first adjacent channel; and
      applying an inverse wavelet transform to the modified wavelet domain traces of the set of channels to generate time domain denoised traces of the set of channels; and
   creating a reduced noise seismic profile based, at least in part, on the denoised traces of the set of channels.

2. The method of claim 1, wherein modifying the wavelet domain traces of the set of channels comprises selecting a set of coefficients of the wavelet domain traces of the set of channels and reducing, in the wavelet domain, magnitudes of the set of coefficients.

3. The method of claim 2, wherein the selection of the set of coefficients is based, at least in part, on the wavelet domain trace of the first adjacent channel.

4. The method of claim 1, further comprising applying a taper to the denoised first region.

5. The method of claim 1, further comprising evaluating at least one characteristic of a subsurface formation based on the reduced noise seismic profile.

6. The method of claim 1, further comprising identifying from the seismic profile the first region as having coherent noise.

7. The method of claim 1, further comprising identifying the set of channels of the plurality of channels within the first region.

8. A system comprising:
   a processor; and
   a machine-readable medium having instructions stored thereon that are executable by the processor to cause the system to,
      identify a first adjacent channel to a first region that is less noisy than the first region, wherein the first region is indicated in a seismic profile and the first region has coherent noise;
      convert, from a time domain to a wavelet domain, traces of a set of channels of a plurality of channels within the first region and a trace of the first adjacent channel, wherein a plurality of channels within the first region include the set of channels;
      modify the wavelet domain traces of the set of channels to suppress the coherent noise based, at least in part, on a comparison of the wavelet domain traces of the set of channels and the wavelet domain trace of the first adjacent channel;
      apply an inverse wavelet transform to the modified wavelet domain traces of the set of channels to generate time domain denoised traces of the set of channels; and
      create a reduced noise seismic profile based, at least in part, on the denoised traces of the set of channels.

9. The system of claim 8, wherein the instructions to modify the wavelet domain traces of the set of channels comprise instructions executable by the processor to cause the system to select a set of coefficients of the wavelet domain traces of the set of channels and reduce, in the wavelet domain, magnitudes of the set of coefficients.

10. The system of claim 9, wherein the instructions to select the set of coefficients comprise instructions executable by the processor to cause the system to select the set of coefficients based, at least in part, on the wavelet domain trace of the first adjacent channel.

11. The system of claim 8, wherein the machine-readable medium further has stored thereon instructions executable by the processor to cause the system to evaluate at least one characteristic of a subsurface formation based on the reduced noise seismic profile.

12. The system of claim 8, wherein the machine-readable medium further has stored thereon instructions executable by the processor to cause the system to apply a taper to the first region.

13. The system of claim 8, wherein the machine-readable medium further has stored thereon instructions executable by the processor to cause the system to identify the seismic profile from the first region having coherent noise.

14. A non-transitory, machine-readable medium having program code stored thereon that is executable by a machine, the program code comprising instructions to:
   identify a first adjacent channel to a first region that is less noisy than the first region, wherein the first region is indicated in a seismic profile and the first region has coherent noise;
   convert, from a time domain to a wavelet domain, traces of a set of channels of a plurality of channels within the first region and a trace of the first adjacent channel;
   modify the wavelet domain traces of the set of channels to suppress the coherent noise based, at least in part, on a comparison of the wavelet domain traces of the set of channels and the wavelet domain trace of the first adjacent channel;

apply an inverse wavelet transform to the modified wavelet domain traces of the set of channels to generate time domain denoised traces of the set of channels; and create a reduced noise seismic profile based, at least in part, on the denoised traces of the set of channels.

15. The non-transitory machine-readable medium of claim 14, wherein the instructions to modify the wavelet domain traces of the set of channels comprise instructions to select a set of coefficients of the wavelet domain traces of the set of channels and reduce, in the wavelet domain, magnitudes of the set of coefficients.

16. The non-transitory machine-readable medium of claim 15, wherein the instructions to select the set of coefficients comprise instructions to select the set of coefficients based, at least in part, on the wavelet domain trace of the first adjacent channel.

17. The non-transitory machine-readable medium of claim 14, wherein the program code further comprises instructions to apply a taper to the first region.

18. The non-transitory machine-readable medium of claim 14, wherein the program code further comprises instructions to evaluate at least one characteristic of a subsurface formation based on the reduced noise seismic profile.

19. The non-transitory machine-readable medium of claim 14, wherein the program code further comprises instructions to identify the seismic profile from the first region based, at least in part, on the first region having coherent noise.

20. The non-transitory machine-readable medium of claim 14, wherein the program code further comprises instructions to identify the set of channels of the plurality of channels within the first region.

* * * * *